United States Patent
Laurence et al.

(10) Patent No.: US 9,841,515 B2
(45) Date of Patent: Dec. 12, 2017

(54) DEAD PIXEL IDENTIFICATION IN POSITRON EMISSION TOMOGRAPHY (PET)

(71) Applicant: KONINKLIJKE PHILIPS N.V., Eindhoven (NL)

(72) Inventors: Thomas Leroy Laurence, North Royalton, OH (US); Sharon Xiaorong Wong, Highland Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/121,071

(22) PCT Filed: Mar. 19, 2015

(86) PCT No.: PCT/IB2015/052019
§ 371 (c)(1),
(2) Date: Aug. 24, 2016

(87) PCT Pub. No.: WO2015/145310
PCT Pub. Date: Oct. 1, 2015

(65) Prior Publication Data
US 2017/0115409 A1    Apr. 27, 2017

Related U.S. Application Data (60) Provisional application No. 61/971,780, filed on Mar. 28, 2014.

(51) Int. Cl.
G01D 18/00  (2006.01)
G01T 7/00   (2006.01)
G01T 1/29   (2006.01)

(52) U.S. Cl.
CPC ............ G01T 7/005 (2013.01); G01T 1/2985 (2013.01)

(58) Field of Classification Search
CPC ... G01T 1/2928; G01T 1/2018; G01T 1/1647; G01T 1/17
See application file for complete search history.

(56) References Cited

U.S. PATENT DOCUMENTS

| | | | |
|---|---|---|---|
| 6,694,172 B1 * | 2/2004 | Gagnon | G01T 1/2928 250/363.02 |
| 7,518,102 B2 | 4/2009 | Petrillo | |
| 8,395,127 B1 | 3/2013 | Frach | |
| 2002/0065611 A1 * | 5/2002 | Boehm | A61B 6/583 702/35 |
| 2005/0063513 A1 | 3/2005 | Hsieh | |

(Continued)

FOREIGN PATENT DOCUMENTS

| | | |
|---|---|---|
| EP | 0984939 | 3/2000 |
| WO | 03/001243 | 1/2003 |
| WO | 2015/145301 | 10/2015 |

*Primary Examiner* — Kiho Kim (57) ABSTRACT

A system (10) and a method (150) identify non-functioning pixels in positron emission tomography (PET) imaging. Data describing scintillation events localized to a plurality of pixels (22, 32) of a PET scanner (12) is received. A count map histogram is generated from the received data. The count map histogram maps each of the pixels (22, 32) to a count of scintillation events localized to the pixel (22, 32). One or more non-functioning pixels are identified from the count map histogram.

20 Claims, 5 Drawing Sheets

(56) References Cited

U.S. PATENT DOCUMENTS

| | | | |
|---|---|---|---|
| 2008/0230708 A1* | 9/2008 | Enomoto | G01T 1/2018 250/370.08 |
| 2010/0078568 A1* | 4/2010 | Byars | G01T 1/1647 250/362 |
| 2010/0193696 A1 | 8/2010 | Blevis | |
| 2011/0017918 A1* | 1/2011 | Baeumer | G01T 1/17 250/370.11 |
| 2011/0235940 A1 | 9/2011 | Pavkovich | |
| 2013/0181112 A1 | 7/2013 | Richardson | |

* cited by examiner

DEAD PIXEL IDENTIFICATION IN POSITRON EMISSION TOMOGRAPHY (PET)

CROSS REFERENCE TO RELATED APPLICATIONS

This application is the U.S. National Phase application under 35 U.S.C. §371 of International Application No. PCT/IB2015/052019, filed Mar. 19, 2015, published as WO 2015/145310 on Oct. 1, 2015, which claims the benefit of U.S. Provisional Patent Application No. 61/971,780 filed Mar. 28, 2014. These applications are hereby incorporated by reference herein.

The present application relates generally to positron emission tomography (PET). It finds particular application in conjunction with identifying non-functioning pixels, and will be described with particular reference thereto. However, it is to be understood that it also finds application in other usage scenarios, and is not necessarily limited to the aforementioned application.

In the past, PET systems have typically employed photomultiplier tubes (PMTs), such as 1.5 inch PMTs, for light detection. A typical PMT based PET system contains anywhere from about 12,000 to 33,000 individual scintillators, but uses only 200 to 800 PMTs. As such, a typical PMT based PET system is fairly intolerant of a non-functioning PMT. Because of the size of PMTs, a non-functioning PMT renders a large part of the detector inoperable. Further, Anger logic does not support calculating the location of scintillation events that occur in an inoperable part of the detector.

More recently, PET systems have been transitioning to silicon photomultipliers (SiPMs), such as 3×3 or 4×4 millimeter (mm) SiPMs, for light detection. In SiPM based PET system, there is a high probability that some of the SiPMs may not function properly. In contrast with a PMT based PET system, the SiPM channel count of a SiPM based PET system approaches the scintillator count. Since the impacted area of a non-functioning SiPM is fairly small, a SiPM based PET system can tolerate non-functioning SiPMs. This applies to a one-to-one coupling of scintillators to SiPMs, and a many-to-one coupling of scintillators to SiPMs where micro-Anger calculations are performed to determine event positions.

While SiPM based PET systems can tolerate non-functioning SiPMs, the quality of reconstructed images is degraded. Non-functioning SiPMs result in non-functioning pixels. A pixel is the smallest area to which a scintillation event can be localized. A non-functionality pixel is a pixel missing valid data and which does not detect counts in proportion to an increase in scintillation events. Non-functioning pixels include dead and low-count pixels. A dead pixel is a pixel which does not detect any scintillation events, and a low-count pixel is a pixel which under counts scintillation events. Non-functioning pixels may also arise due to problems in one or more of scintillator performance, optical coupling between SiPMs and scintillators, and processing electronics. Non-functioning pixels result in imaging artifacts during reconstruction and incorrect standardized uptake values (SUVs). Artifacts during reconstruction are more pronounced for higher statistic scans with a fairly uniform activity in the scanned target volume.

Figure 1:
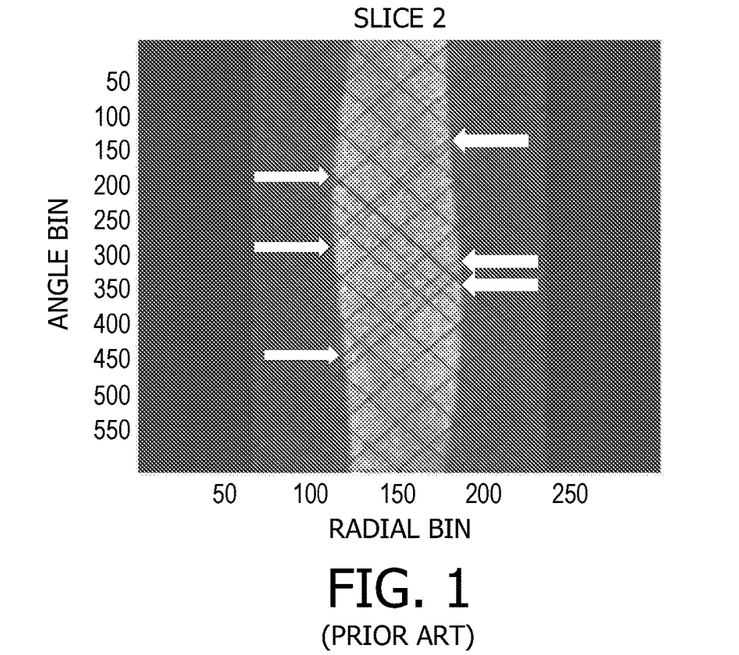
FIG. 1 illustrates a prior art sinogram generated using a positron emission tomography (PET) imaging system with dead pixels.

With reference to FIG. 1, a sinogram generated using a PET scanner with three dead pixels is provided. The sinogram describes spatial information and does not contain time-of-flight (TOF) information. The PET scanner includes a one-to-one coupling between scintillators and SiPMs, and the smallest area to which a scintillation event can be localized (i.e., a pixel) is a SiPM-scintillator pair. As can be seen, dead pixels cause dark lines of missing data, emphasized by the arrows. The gap between the detectors generates the periodic mesh pattern.

The present application provides a new and improved system and method which overcome these problems and others.

In accordance with one aspect, a system for identifying non-functioning pixels in positron emission tomography (PET) imaging is provided. The system includes a pixel identification processor, which receives data describing scintillation events localized to a plurality of pixels of a PET scanner. The pixel identification processor further generates a count map histogram from the received data. The count map histogram maps each of the pixels to a count of scintillation events localized to the pixel. Even more, the pixel identification processor identifies one or more non-functioning pixels from the count map histogram.

In accordance with another aspect, a method for identifying non-functioning pixels in positron emission tomography (PET) imaging is provided. Data describing scintillation events localized to a plurality of pixels of a PET scanner is received. A count map histogram is generated from the received data. The count map histogram maps each of the pixels to a count of scintillation events localized to the pixel. One or more non-functioning pixels are identified from the count map histogram.

In accordance with another aspect, a system for identifying non-functioning pixels in positron emission tomography (PET) imaging is provided. The system includes a plurality of pixels arranged around an examination volume of a PET scanner. Each pixel includes a scintillator and a silicon photomultiplier (SiPM). The system further includes a counter which counts scintillation events received by each SiPM to generate a count map histogram mapping each of the pixels to the count of scintillation events localized to the pixel. The scintillation events are responsive to gamma radiation from a radiation source different from a phantom, such as radiation from the scintillators in the absence of a subject or radiation from a selected region of the subject. Moreover, the system includes a compensation module, which receives PET data from a subject during a PET scan and adjusts the PET data based on the count map histogram to compensate for pixels which have a low or zero count in the count map histogram.

One advantage resides in reduced imaging artifacts.

Another advantage resides in more accurate standardized uptake values (SUVs).

Another advantage resides in increased image quality.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Positron emission tomography (PET) scanners employing silicon photomultipliers (SiPMs) for light detection have a high likelihood of non-functioning pixels. A pixel is the smallest area to which a scintillation event can be localized. A non-functionality pixel is a pixel missing valid data and which does not detect counts in proportion to an increase in scintillation events. Non-functioning pixels include dead and low-count pixels. A dead pixel is a pixel which does not detect any scintillation events, and a low-count pixel is a pixel which under counts scintillation events. Non-functioning pixels may arise due to problems in one or more of scintillator performance, optical coupling between SiPMs and scintillators, SiPMs, and processing electronics.

The present application describes an approach for compensating for non-functioning pixels by filling in the invalid data with data from other pixels. This eliminates missing lines-of-response (LOR) and yields an image better representing the scanned target volume. A number of approaches are described hereafter for filling the invalid data of non-functioning pixels. In one instance, a first order approximation is employed. According to this approach, the event data of pixels neighboring a non-functioning pixel is duplicated and the duplicate data is augmented by replacing the locations of the neighboring pixels with the location of the non-functioning pixel. In another instance, sinogram space interpolation is employed. According to this approach, each position in the sinogram space associated with a non-functioning pixel is interpolated from neighboring positions.

The present application also describes an approach for identifying non-functioning pixels and tracking the identified pixels over time. A quality control (QC) PET scan can be performed each day prior to patient scanning. For the daily QC dataset, a two dimensional (2D) count map histogram is generated, and dead and low-count pixels are identified in the histogram. Dead pixels can be identified as those pixels with no counts, and low-count pixels can be identified as those with counts low relative to neighboring pixels (e.g., less than a percentage of neighbor counts). Further, a patient diagnostic PET scan and/or a background scan (e.g., describing background scintillator activity) can be performed. For each of the patient and background datasets, a 2D count map histogram is generated, and dead and low-count pixels are identified in the histogram. The identified pixels can then be compared against those pixels identified from a daily QC dataset. For a patient dataset, this has the advantage of confirming the validity of the standardized uptake values (SUVs) of the patient dataset.

Figure 2:
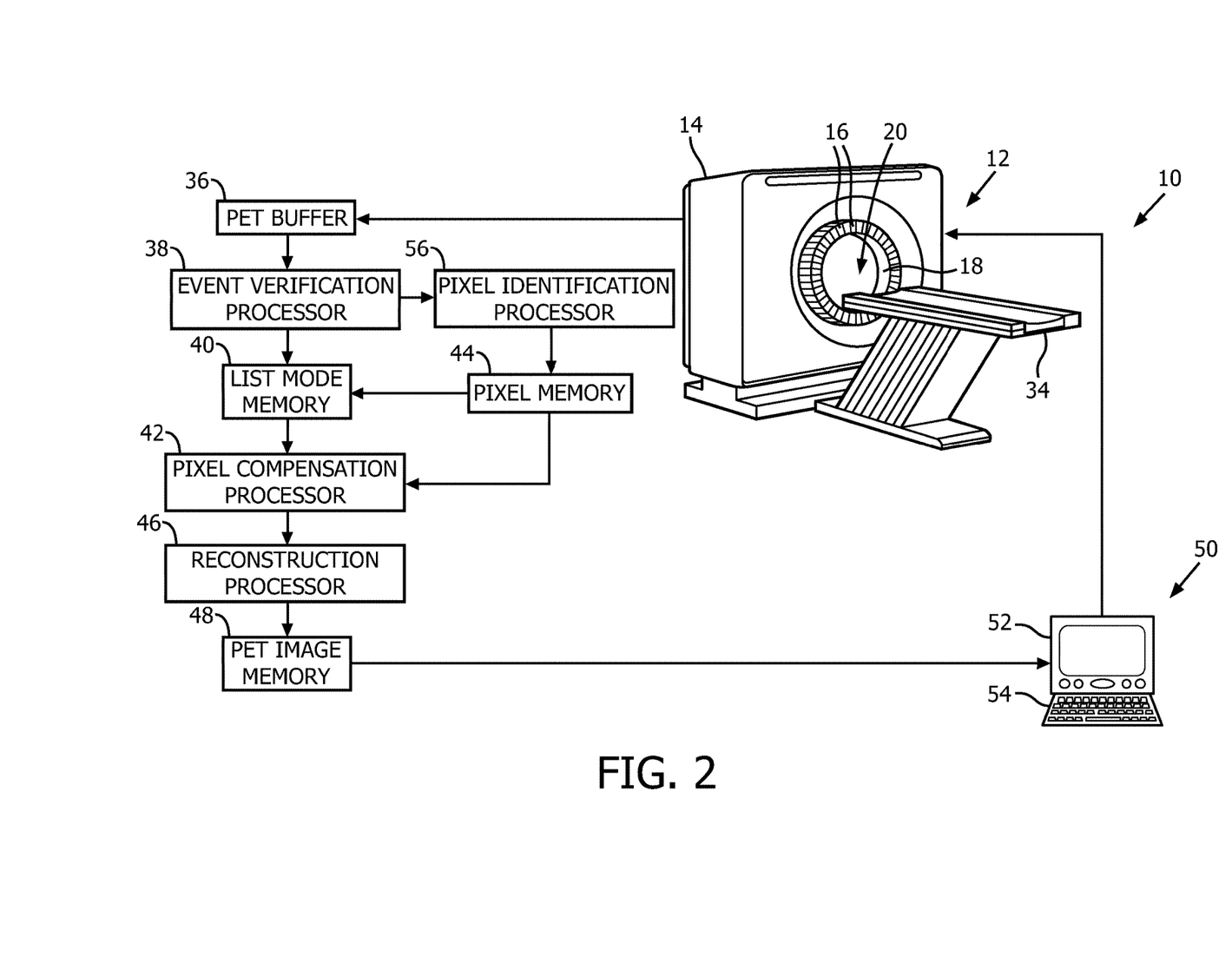
FIG. 2 illustrates a PET imaging system with a pixel compensation processor according to the present application.

With reference to FIG. 2, a PET imaging system 10 includes a PET scanner 12. The PET scanner 12 generates raw scan data and includes a stationary gantry 14 housing a plurality of gamma detectors 16 arranged around a bore 18 of the scanner 12. The bore 18 defines an examination volume 20 for receiving a target volume of a subject to be imaged, such as a brain, torso, or the like. The detectors 16 are typically arranged in one or more stationery rings which extend the length of the examination volume 20. However, rotatable heads are also contemplated. The detectors 16 detect gamma photons from the examination volume 20 and generate the raw scan data.

Figure 3:
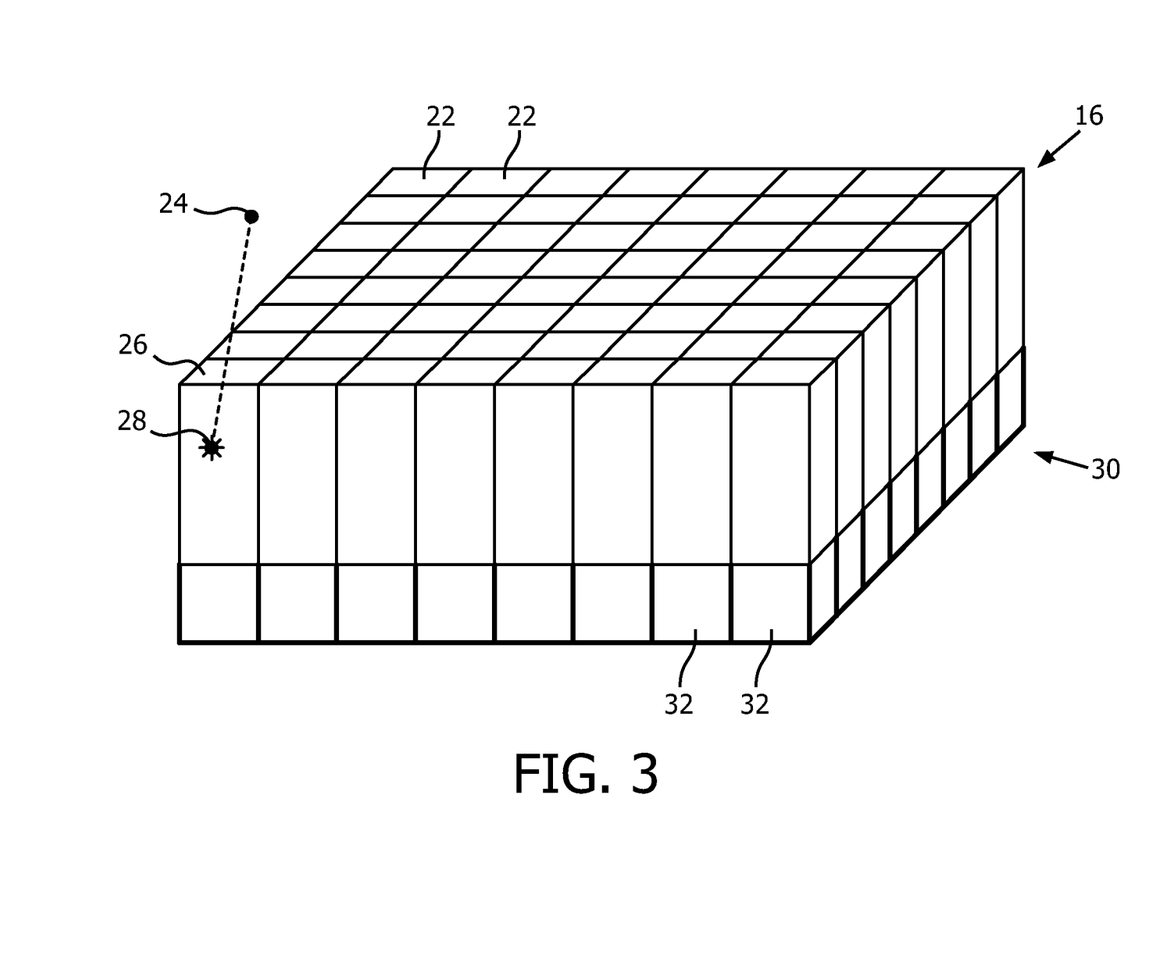
FIG. 3 illustrates a detector of the PET imaging system of FIG. 2.

With reference to FIG. 3, each of the detectors 16 includes one or more scintillators 22 arranged in a grid. The scintillators 22 scintillate and generate visible light pulses in response to energy depositions by gamma photons. As illustrated, a gamma photon 24 deposits energy in a scintillator 26, thereby resulting in a visible light pulse 28. The magnitude of a visible light pulse is proportional to the magnitude of the corresponding energy deposition. Examples of scintillators 22 include sodium iodide doped with thallium (NaI(Tl)), cerium-doped lutetium yttrium orthosilicate (LYSO) and cerium doped lutetium oxyorthosilicate (LSO).

In addition to the scintillators 22, the detectors 16 each includes a sensor 30 detecting the visible light pulses in the scintillators 22. The sensor 30 includes a plurality of light sensitive elements 32. The light sensitive elements 32 are arranged in a grid of like size as the grid of scintillators 22 and optically coupled to corresponding scintillators 22. The light sensitive elements 32 can be coupled to the scintillators 22 in a one-to-one arrangement, a one-to-many arrangement, a many-to-one arrangement, or any other arrangement. Typically, as illustrated, the light sensitive elements 32 are silicon photomultipliers (SiPMs), but photomultiplier tubes (PMTs) are also contemplated.

Where the light sensitive elements 32 are SiPMs, there is typically a one-to-one correspondence between the scintillators 22 and the light sensitive elements 32, as illustrated, but other correspondences are contemplated. Each of the SiPMs includes a photodiode array (e.g., Geiger-mode avalanche photodiode arrays), each photodiode corresponding to a cell of the photodiode array. Suitably, the SiPMs 32 are configured to operate in a Geiger mode to produce a series of unit pulses to operate in a digital mode. Alternatively, the SiPMs can be configured to operate in an analog mode. Where the light sensitive elements 32 are PMTs, there is often a many-to-one correspondence between the scintillators 22, but other correspondences are contemplated.

Referring back to FIG. 2, during a scan of a subject using the scanner 12, a target volume of the subject is injected with a radiopharmaceutical or radionuclide. The radiopharmaceutical or radionuclide causes gamma photons to be emitted from the target volume. The target volume is then positioned in the examination volume 20 using a subject support 34 corresponding to the scanner 12. Once the target volume is positioned within the examination volume 20, the scanner 12 is controlled to perform a scan of the target volume and event data is acquired. The acquired event data describes the time, location and energy of each scintillation event detected by the detectors 16 and is suitably stored in a PET data buffer 36.

The location of a scintillation event corresponds to a pixel of the scanner 12. A pixel is the smallest area to which a scintillation event can be localized. For example, suppose the light sensitive elements 32 are SiPMs and there is a one-to-one coupling between scintillators 22 and light sensitive elements 32. In such instances, the smallest area to which a scintillation event can be localized is typically a scintillator/SiPM pair, whereby a pixel typically corresponds to a scintillator/SiPM pair. As another example, suppose the light sensitive elements 32 are PMTs or SiPMs and there is a many-to-one coupling between scintillators 22 and light sensitive elements 32. In such instances, Anger logic is typically used to localize scintillation events to individual scintillators 22, whereby a pixel typically corresponds to a scintillator 22, but not a light sensitive element 32.

Subsequent to acquisition, or concurrently therewith, an event verification processor 38 filters the buffered event data. The filtering includes comparing energy (cell counts in the digital mode) of each scintillation event to an energy window, which defines the acceptable energy range for scintillation events. Those scintillation events falling outside the energy window are filtered out. Typically, the energy window is centered on the known energy of the gamma photons to be received from the examination volume 20 (e.g., 511 kiloelectron volt (keV)) and determined using the full width half max (FWHM) of an energy spectrum generated from a calibration phantom. The event verification processor 38 further generates lines of response (LORs) from the filtered event data. A LOR is defined by a pair of gamma photons striking the detectors 16 within a specified time difference of each other (i.e., a coincident event). The specified time difference is small enough to ensure the gammas are from the same annihilation event. Hence, assuming that there is a one-to-one correspondence between scintillation events and gamma photons striking the detectors 16, a LOR can be defined by a pair of scintillation events.

The foregoing filtering of event data and determining of LORs assumed that there was a one-to-one correspondence between scintillation events and gamma photons striking the detectors 16. However, those skilled in the art will appreciate that in practice, a gamma photon can yield multiple scintillation events. In some instances, before the event data is passed to the event verification processor 38, the scintillation events of the event data are combined based on gamma photon. For example, the energy of scintillation events belonging to a common gamma photon can be summed and the location with which the gamma photon struck the detectors 16 can be approximated. The event verification processor 38 then filters and determines LORs from the updated event data.

Data describing the coincident events, as or once determined by the event verification processor 38, is stored within a list mode memory 40 as a list, where each list item corresponds to a coincident event. The data for each of the list items describes the corresponding LOR by the spatial data (e.g., by the X and Z locations) for the two pixels to which the pair of gamma photons of the LOR are localized. Further, the data for each of the list items can optionally describe the energy of the two gamma photons of the corresponding coincident event, and/or either the times stamps of the two gamma photons or the difference between the times stamps of the two gamma photons.

A pixel compensation processor 42 receives the list mode data, as it is being generated or once it's generated, and fills in missing event data for non-functioning pixels identified in a pixel memory 44 by using event data from other pixels. A non-functionality pixel is a pixel missing valid data and which does not detect counts in proportion to an increase in scintillation events. Non-functioning pixels include dead and low-count pixels. A dead pixel is a pixel which does not detect any scintillation events, and a low-count pixel is a pixel which under counts scintillation events. Non-functioning pixels may arise due to problems in one or more of scintillator performance, optical coupling between light sensitive elements 32 and scintillators 22, light sensitive elements 32, and processing electronics.

Because PET scanners acquire three-dimensional (3D) data, a simple flood and/or uniformity correction cannot be performed at the detectors 16, as is done in single-photon emission computed tomography (SPECT) and computed tomography (CT). PET requires the missing pixel pair to be generated. Any approach can be employed to fill in data missing for non-functioning pixels, but two approaches use first order approximation and sinogram space interpolation, respectively.

According to the first order approximation approach, the list mode data is directly used. As noted above, the list mode data contains a list item for each detected coincident event. Compensation for each non-functioning pixel is performed by, for each list item corresponding to a neighboring pixel, determining whether the list item meets selection criteria and, if so, both duplicating the list item and replacing the location of the neighboring pixel with the location of the non-functioning pixel in the duplicate list item. A neighboring pixel is typically any pixel immediately adjacent to the non-functioning pixel, but different criteria can be employed to define what a neighboring pixel is. For example, a neighboring pixel can be any pixel sharing a detector ring with the non-functioning pixel, and/or being immediately adjacent to the non-functioning pixel or within a predetermined number of pixels (e.g., 2 pixels) of the non-functioning pixel.

As noted above, a list item is processed only if selection criteria are met. No specific selection criteria need to be employed. In a simple case, all list items are selected. In more complicated cases, a list item is probabilistically selected. For example, each neighboring pixel is associated with a probability of an event being relevant to the non-functioning pixel. The probability can be based on the distance of the neighboring pixel to the non-functioning pixel and/or whether the neighboring pixel is on the same detector ring as the non-functioning pixel. For example, the probability can be lower the farther away the neighboring pixel is from the non-functioning pixel and/or lower when the neighboring pixel is on a different detector ring as the non-functioning pixel. When a list item corresponding to a neighboring pixel is encountered, a random number is determined. If the probability of the determined random number is less than or equal to the probability of the neighboring pixel, the list item is selected.

According to the sinogram space interpolation approach, the list mode data is converted to sinograms, one for each slice. This conversion can alternatively be performed by another component of the system 10, whereby the pixel compensation processor 42 receives sinogram data instead of list mode data. Typically, the sinograms are generated from true, scatter and random coincident events (collectively referred to as prompt coincident events), but the sinograms can be generated from any combination of true, scatter and random coincident events. For example, the sinograms can be generated from true and random coincident events.

The sinogram space is sometimes referred to as the LOR space since each position signifies the pair of pixels that measured a coincident event. While sinograms typically only provide the spatial connectivity data for pixels, sinograms can be extended to include time-of-flight (ToF) data describing the ToF values for each coincident data. The ToF value for a coincident event is the difference in time measurements between the pair of pixels detecting the coincident event. To extend sinograms to include ToF data, each sinogram (corresponding to a slice) is divided into frames, one for each of a plurality of ToF bins. The ToF bins collectively span the range of possible ToF values for the scanner 12, with each individual ToF bin spanning a sub-range corresponding to the ToF precision of the scanner 12.

For example, a typical scanner has a ToF precision of about 25 picoseconds (ps), whereby each of the ToF bins typically spans a 25 ps range. Further, a typical scanner has +/−2.5 nanosecond (ns) range of ToF values, where a typical sinogram includes 201 frames.

Using the sinograms, values for each discreet location (i.e., positions) in the sinograms that are associated with non-functioning pixels are interpolated (i.e., estimated) from neighboring positions. Where the sinograms include ToF data, a position is specific to a frame. As those skilled in the art will appreciate, a non-functioning pixel manifests as a diagonal line of missing data in a sinogram. A neighboring position is typically any position immediately adjacent to the position being estimated, but different criteria can be employed to define what a neighboring position. Neighboring positions of a position being estimated can span across sinograms and/or, where ToF data is included, frames. Alternatively, neighboring positions of a position being estimated can be limited to the same sinogram or, where ToF data is included, the same frame.

Advantageously, by using sinograms, the interpolation can include data modeling to fit the known data and to estimate missing pixel data. The interpolation can be performed using any suitable interpolation technique. For example, the interpolation can be performed using the well-known nearest neighbor interpolation technique. As another example, more complicated techniques, such as the well-known bilinear interpolation technique or pattern matching techniques, can be employed. The bilinear interpolation technique performs a weighting of neighbor values, and pattern matching techniques examines the shape of the sine waves within the sinograms. Asymmetrical weighting may be performed for edge pixels of detectors that generally have lower collection efficiency due to Compton (i.e., scatter) events not being collected as efficiently as center pixels of detectors.

As should be appreciated, the sinogram space interpolation approach is much more computationally intensive than the first order approximation approach. Whereas the first order approximation approach can be performed while the list mode data is being generated, the sinogram space interpolation approach can only be performed once the list mode data is generated. The sinogram space interpolation approach uses the final values for neighboring pixels to estimate the value for non-functioning pixels.

Figure 4:
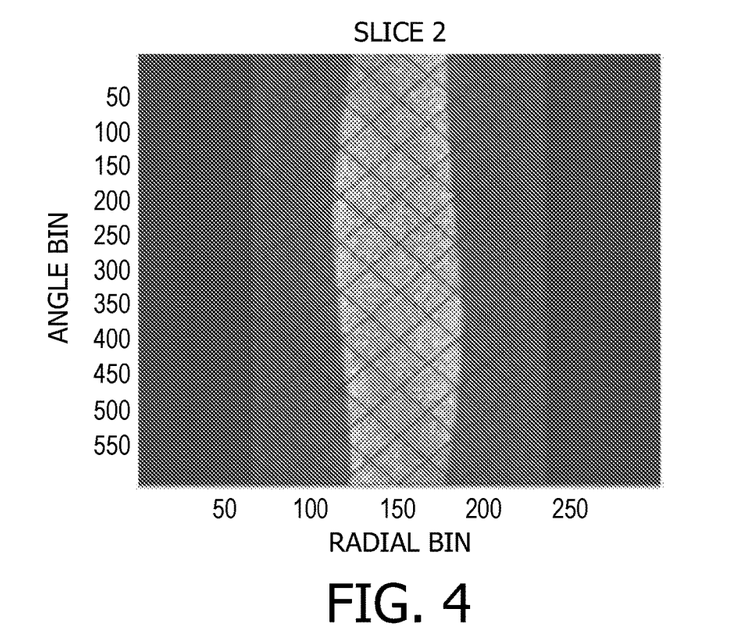
FIG. 4 illustrates a sinogram generated from the same data as the sinogram of FIG. 1 and using pixel compensation according to the present application.

Referring to FIG. 4, a sinogram compensated for three dead pixels is provided. The sinogram was generated from the same data used to generate the sinogram of FIG. 1. The data for the dead pixels was approximated using the sinogram space interpolation approach. As can be seen, through comparison with the sinogram of FIG. 1, the compensated sinogram provides cleaner data for reconstruction that eliminates artifacts in the reconstructed image. Notably, the areas of missing data, demarcated by the arrows of FIG. 1, have been filled with data.

Referring back to FIG. 2, a PET reconstruction processor 46 reconstructs the corrected list mode data and/or sinogram data from the pixel compensation processor 42 into a final, reconstructed image of the target volume. The reconstructed image is typically stored in a PET image memory 48. To generate the reconstructed image, any suitable reconstruction algorithm can be employed. For example, an iterative-based reconstruction algorithm can be employed.

A control system 50, such as a computer, provides a graphical user interface (GUI) to users of the system. The GUI makes use of a display device 52 and a user input device 54 to allow the users to interact with the control system 50. By way of the GUI, the control system 50 can be employed to control the scanner 12 to image a subject. For example, the user can coordinate a PET image of a target volume of the subject. Further, by way of the GUI, the control system 50 can be employed to view and, optionally, manipulate images stored in the image memory 48. For example, an image of the image memory can be displayed on the display device 52.

The foregoing discussion dealt with imaging a patient and compensating for non-functioning pixels identified in the pixel memory 44. It was assumed that the identities of the non-functioning pixels were known and stored in the pixel memory 44. In some instances, a pixel identification processor 56 identifies the non-functioning pixels of the pixel memory 44 and tracks the identified non-functioning pixels. In such instances, a PET scan is performed and event data is acquired. The acquired event data describes the time, location and energy of each scintillation event detected by the detectors 16 and is suitably stored in the PET data buffer 36. The PET scan can be performed with nothing in the examination volume 20, a phantom in the examination volume 20, or a target volume of a subject in the examination volume 20.

Subsequent to acquisition, or concurrently therewith, the event verification processor 38 filters the buffered event data, as described above. The filtering includes comparing energy of each scintillation event to an energy window, which defines the acceptable energy range for scintillation events. Those scintillation events falling outside the energy window are filtered out. Only the remaining scintillation events (i.e., single scintillation events) can then be passed to the pixel identification processor 56. Alternatively, the event verification processor 38 further generates lines of response (LORs) from the filtered event data. A LOR is defined by a pair of gamma photons striking the detectors 16 within a specified time difference of each other (i.e., a coincident event). Only those scintillation events associated with a LOR (i.e., coincident scintillation events) are then passed to the pixel identification processor 56.

The pixel identification processor 56 receives the single or coincident scintillation events and generates a count map histogram. The count map histogram uniquely maps each pixel of the detectors 16 to the summation of scintillation events corresponding to the pixel. Typically, the count map histogram uniquely identifies the pixels by location, but other unique identifiers can be employed. Where location is employed to uniquely identify the pixels, the count map histogram is an n-dimensional count map histogram, where n is the number of spatial dimensions needed to uniquely identify the locations of the pixels. For example, supposing the detectors 16 are arranged around a cylindrical bore, as illustrated, a 2D count map histogram is suitably employed. The 2D count map histogram uniquely identifies the pixels by two dimensions: a first dimension running parallel to the axis of the cylinder on a boundary surface of the bore 18; and a second dimension running perpendicular to the first dimension on the boundary surface in a circle.

After generating the count map histogram, the count map histogram is analyzed to identify non-functioning pixels. As described above, a non-functionality pixel is a pixel missing valid data and which does not detect counts in proportion to an increase in scintillation events. Non-functioning pixels include dead and low-count pixels. A dead pixel is a pixel which does not detect any scintillation events, and a low-count pixel is a pixel which under counts scintillation events. Dead pixels are identified as those pixels with zero counts. Low-count pixels are those pixels less than a predetermined percentage, such as 30%, of the average pixel count of all pixels or of the average pixel count of neighboring pixels. In some instances, the predetermined percentage varies with the reconstruction algorithm employed.

The unique identifiers of the identified non-functioning pixels can be stored in the pixel memory 44 for use during pixel compensation. Further, the identified non-functioning pixels can be compared against previously identified non-functioning pixels (i.e., non-functioning pixels identified from a previous PET scan) of the pixel memory 44. The pixel memory 44 can then be updated to include the unique identifiers of any newly identified non-functioning pixels. Even more, non-functioning pixels can be tracked over time. In some instances, a newly identified non-functioning pixel is only used for pixel compensation after it has been identified as non-functioning in a predetermined number of scans.

Figure 5:
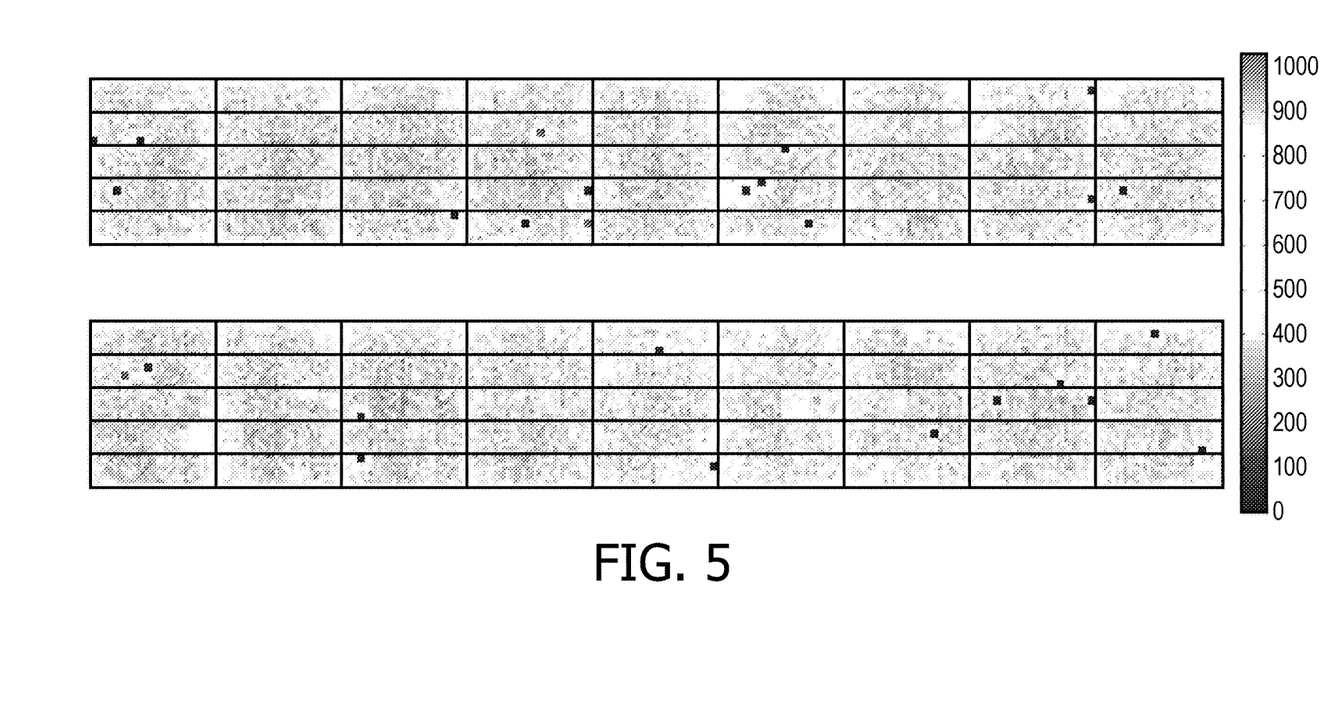
FIG. 5 illustrates a singles event count map histogram with non-functioning pixels.

With reference to FIG. 5, a 2D count map histogram for single scintillation events illustrates the location of non-functioning pixels. The histogram was obtained by a PET scan of a phantom, the phantom being a well centered point source. All pixels would ideally have approximately the same number of counts, but this is practically unlikely. As illustrated, the majority pixel counts are in the range of 800 to 1000. However, there are some pixels with counts below 200, shown in black. Of these pixels, dead pixels can be identified as those with zero counts, and low low-count pixels can be identified as those with counts below a certain percentage of the average count of all the pixels or neighboring pixels. The data for low-count pixels essentially amounts to noises and needs to be discarded to prevent the noise from being injected in the reconstruction.

In some instances, the pixel identification processor 56 is employed in a daily QC process. The daily QC process is performed each day prior to performing any diagnostic PET scans. It includes positioning a phantom in the center of the examination volume 20 and acquiring event data. The phantom can be, for example, a point source, an axial volume source, or a cylinder volume source. The cylinder volume source can, for example, include a diameter and length of 20 centimeters (cm). The acquired event data is filtered by the event verification processor 38 and passed to the pixel identification processor 56. When the phantom is a point source, only single scintillation events are passed to the pixel identification processor 56. When the phantom is an axial volume source or a cylinder volume source, single scintillation events or coincident scintillation events can be passed to the pixel identification processor 56. The pixel identification processor 56 is then employed to update and track the identified non-functional pixels in the pixel memory 44.

Further, in some instances, the pixel identification processor 56 is employed in a patient QC process. The patient QC process is performed in response to a diagnostic scan of a subject. That is to say, after the target volume of the subject is placed within the examination volume 20 and event data is acquired, the patient QC process is performed. According to the patient QC process, the acquired event data is filtered by the event verification processor 38 and single or coincident scintillation events are passed to the pixel identification processor 56. The pixel identification processor 56 is then employed to update and track the identified non-functional pixels in the pixel memory 44. Typically, this includes comparing the identified non-functioning pixels against those identified by the latest daily QC process. By identifying those pixels that are non-functioning, the SUV values of those pixels that are functioning can be confirmed.

Even more, in some instances, the pixel identification processor 56 is employed in a background QC process. The background QC process is performed when the PET scanner 12 is idle. It can, for example, be performed periodically, such as every 2 hours of idle time. According to the background QC process, event data is acquired without anything in the scanner 12 to measure background radiation of the scintillators 22, such as LYSO crystal background radiation. The acquired event data is then filtered by the event verification processor 38. Single or coincident scintillation events are passed to the pixel identification processor 56. The pixel identification processor 56 updates and tracks the identified non-functional pixels in the pixel memory 44 using the scintillation events. Typically, this includes comparing the identified non-functioning pixels against those identified by the latest daily QC process.

In some instances, one or more of the data buffer 36, the event verification processor 38, the list mode memory 40, the pixel compensation processor 42, the reconstruction processor 46, the image memory 48, the pixel memory 44, and the pixel identification processor 56 are integrated with the control system 50. For example, the reconstruction processor 46, the pixel compensation processor 42, and the event verification processor 38 can share a common processor of the control system 50. In such instances, the reconstruction processor 46, the pixel compensation processor 42, and the event verification processor 38 are typically implemented as software modules. The software modules are stored on a memory of the control system 50 and executed by a processor of the control system 50.

Further, in some instances, rather than acquiring the data for non-functioning pixels, such as low-count pixels, and later replacing it during pixel compensation, the data for such pixels can be discarded on the scanner 12 in, for example, a field programmable gate array (FPGA). In such instances, zero scintillation events will be acquired for all non-functioning pixels, even low-count pixels. Hence, low-count pixels will appear as dead pixels.

Figure 6:
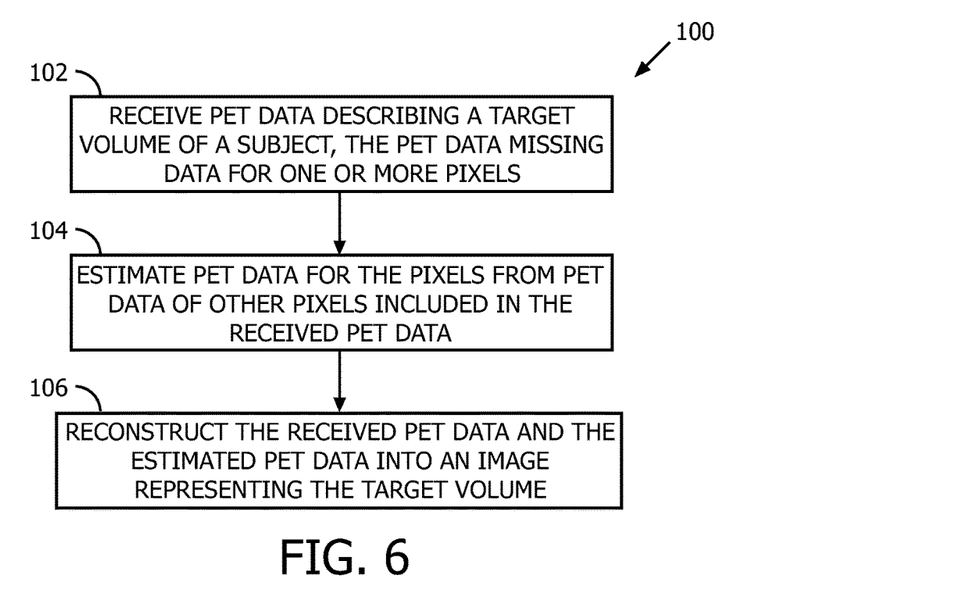
FIG. 6 illustrates a method of compensating for non-functioning pixels in PET imaging.

With reference to FIG. 6, a method 100 for compensating for non-functioning pixels in PET imaging is provided. The method 100 is suitably performed by one or more processors 42, 44. In that regard, the method 100 is typically embodied by processor executable instructions stored on a memory and executed by the processors 42, 44.

According to the method 100, PET data describing a target volume of a subject and generated by a PET scanner 12 is received 102. The PET data is missing or invalid for one or more pixels of the scanner 12. These so called non-functioning pixels, such as dead pixels and low-count pixels, may arise due to problems in one or more of scintillator performance, optical coupling between light sensitive elements and scintillators, light sensitive elements, and processing electronics. Examples of the light sensitive elements include SiPMs and PMTs. Using the received PET data, PET data is estimated 104 for the non-functioning pixels. In contrast with SPECT, PET data is three dimensional (3D). Hence, the process of estimating PET data is more involved than in SPECT.

In some instances, the received PET data is list mode data, each list item corresponding to a coincident event. In such instances, one approach to estimating the PET data for a non-functioning pixel includes duplicating list items associated with neighboring pixels. The locations of the neighboring pixels in the duplicate PET data are then replaced with the location of the non-functioning pixel. While all the list items associated with neighboring pixels can be employed, the list items can also be intelligently selected.

For example, list items associated with neighboring pixels can be probabilistically selected. In some instances, the received PET data is sinogram data, optionally including ToF data. In such instances, one approach to estimating the PET data for a non-functioning pixel includes interpolating a value for each discreet location in the sinogram domain that is associated with the non-functioning pixel from the values of neighboring locations. For example, nearest neighbor interpolation can be performed.

Once data is estimated for the non-functioning pixels, the combination of the received data and the estimated data is reconstructed 106 into an image representing the target volume. To generate the reconstructed image, any suitable reconstruction algorithm can be employed. For example, an iterative-based reconstruction algorithm can be employed.

Figure 7:
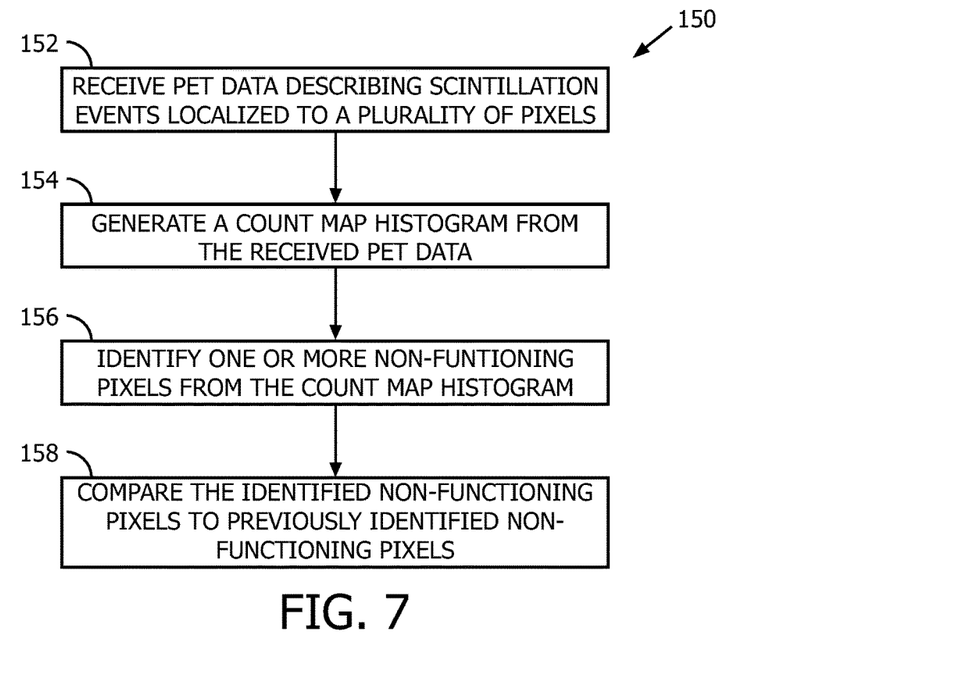
FIG. 7 illustrates a method of identifying non-functioning pixels in PET imaging.

With reference to FIG. 7, a method 150 for identifying non-functioning pixels in PET imaging is provided. The method 150 is suitably performed by one or more processors 56. In that regard, the method 150 is typically embodied by processor executable instructions stored on a memory and executed by the processors 56.

According to the method 150, PET data describing scintillation events localized to the pixels of the detectors 16 is received 152. The PET data is typically received from the event verification processor 38 and describes one of single scintillation events and coincident scintillation events. In one instance, the PET data is received each day before performing diagnostic scans of a subject and describes gamma photons emitted from a phantom, such as a point source. In another instance, the PET data is received from a diagnostic scan of a subject and describes gamma photons emitted from a target volume of the subject. In another instance, the PET data is received from a background scan and describes background radiation of the scintillators 22.

A count map histogram is generated 154 from the received PET data. The count map histogram maps each of the pixels to the summation of scintillation events localized to the pixel. Within the count map histogram, the pixels are typically uniquely identified by location, but other identifiers are contemplated. Using the count map histogram, one or more non-functioning pixels are identified 156 from the count map histogram. In one instance, the non-functioning pixels include a dead pixel and the identifying includes identifying a pixel in the count map histogram with a zero count as the dead pixel. In another instance, the non-functioning pixels include a low-count pixel and the identifying includes identifying a pixel in the count map histogram with a count less than a predetermined percentage of the other pixels, such as 30%, as the low-count pixel.

In some instances, the identified non-functioning pixels are compared 158 to previously identified non-functioning pixels. This advantageously allows non-functioning pixels to be tracked and trends to emerge. The identified non-functioning pixels are typically identified from PET data generated from a diagnostic scan or a background scan, whereas the previously identified non-functioning pixels are typically identified from PET data generated each day before performing diagnostic scans.

As used herein, a memory includes any device or system storing data, such as a random access memory (RAM) or a read-only memory (ROM). Further, as used herein, a processor includes any device or system processing input device to produce output data, such as a microprocessor, a microcontroller, a graphic processing unit (GPU), an application-specific integrated circuit (ASIC), a FPGA, and the like; a controller includes any device or system controlling another device or system, and typically includes at least one processor; a user input device includes any device, such as a mouse or keyboard, allowing a user of the user input device to provide input to another device or system; and a display device includes any device for displaying data, such as a liquid crystal display (LCD) or a light emitting diode (LED) display.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A system for identifying non-functioning pixels in positron emission tomography (PET) imaging, said system comprising:
    a pixel identification processor configured to:
        receive data describing scintillation events localized to a plurality of pixels of a PET scanner;
        generate a count map histogram from the received data, the count map histogram mapping each of the pixels to a count of scintillation events localized to the pixel; and
        identify one or more non-functioning pixels from the count map histogram;
        store unique identifiers of the identified non-functioning pixels in a pixel memory for use during pixel compensation; and
        compare the identified non-functioning pixels against previously identified non-functioning pixels of the pixels memory;
        wherein a newly identified non-functioning pixel is only used for pixel compensation after it has been identified as non-functioning in a predetermined number of scans.

2. The system according to claim 1, wherein each pixel includes a silicon photomultiplier (SiPM) and a scintillator, and wherein the scintillation events are responsive to radiation received from a source in the examination volume of the PET scanner or background radiation in the scintillators.

3. The system according to claim 1, wherein the pixels are configured to receive radiation during a diagnostic PET scan of a subject to generate the data from gamma photons emitted from a target volume of the subject.

4. The system according to claim 1, wherein the pixels are configured to receive radiation from background radiation emitted by the scintillators.

5. The system according to claim 1, wherein the pixel identification processor is configured to receive the data each day before performing diagnostic scans of a patient, the data describing gamma photons emitted from a phantom.

6. The system according to claim 1, wherein the pixel identification processor is further configured to:
    identify the non-functioning pixels from data generated from a diagnostic scan or a background scan, and identify the previously identified non-functioning pixels from data generated each day before performing diagnostic scans.

7. The system according to claim 1, further including:
    a pixel compensation processor configured to:
        receive PET data describing radiation emitted from a subject, the PET data missing valid PET data from the non-functioning pixels; and
        estimates PET data for the non-functioning pixels from the received PET data.

8. The system according to claim 7, wherein the pixel compensation processor is configured to estimates the missing PET data for one of the identified non-functioning pixels by:
  interpolating PET data from neighboring pixels in a sinogram domain.

9. The system according to claim 7, wherein the pixel compensation processor is configured to estimates the missing PET data for one of the identified non-functioning pixels by:
  duplicating PET data of a functioning neighboring pixel; and
  replacing the missing PET data with the duplicate PET data.

10. The system according to claim 1, wherein the non-functioning pixels include at least one of a dead pixel and a low-count pixel, wherein a pixel in the count map histogram having a zero count is a dead pixel, and wherein a pixel in the count map histogram with a count less than a predetermined percentage of the other pixels is a low-count pixel.

11. A method for identifying non-functioning pixels in positron emission tomography (PET) imaging, said method comprising:
  receiving data describing scintillation events localized to a plurality of pixels of a PET scanner;
  generating a count map histogram from the received data, the count map histogram mapping each of the pixels to a count of scintillation events localized to the pixel; and
  identifying one or more non-functioning pixels from the count map histogram;
  storing unique identifiers of the identified non-functioning pixels in a pixel memory for use during pixel compensation; and
  comparing the identified non-functioning pixels against previously identified non-functioning pixels of the pixels memory;
  wherein a newly identified non-functioning pixel is only used for pixel compensation after it has been identified as non-functioning in a predetermined number of scans.

12. The method according to claim 11, wherein each pixel includes a silicon photomultiplier (SiPM) and a scintillator, and wherein the scintillation events are responsive to radiation received from a source in the examination volume of the PET scanner or background radiation in the scintillators.

13. The method according to claim 11, further including:
  receiving the PET data each day before performing diagnostic scans of a patient, the PET data describing gamma photons emitted from a phantom.

14. The method according to claim 11, further including:
  receiving the PET data from a diagnostic scan of a subject, the PET data describing gamma photons emitted from a target volume of the subject.

15. The method according to claim 11, further including:
  receiving the PET data from a background scan, the PET data describing background radiation of scintillators.

16. The method according to claim 11, further including:
  identifying the non-functioning pixels from PET data generated from a diagnostic scan or a background scan, and
  identifying the previously identified non-functioning pixels from PET data generated each day before performing diagnostic scans.

17. The method according to claim 11, further including:
  receiving PET data describing a target volume of a subject, the PET data missing valid data for the identified non-functioning pixels; and
  estimating PET data for the identified non-functioning pixels from the received PET data.

18. The method according to claim 11, wherein the identifying includes at least one of:
  identifying a pixel in the count map histogram with a zero count as a dead pixel of the non-functioning pixels; and
  identifying a pixel in the count map histogram with a count less than a predetermined percentage of the other pixels as a low-count pixel of the non-functioning pixels.

19. At least one processor programmed to perform the method according to claim 11.

20. A system for identifying non-functioning pixels in positron emission tomography (PET) imaging, said system comprising:
  a plurality of pixels arranged around an examination volume of a PET scanner, each pixel including a scintillator and a silicon photomultiplier (SiPM);
  a counter which counts scintillation events received by each SiPM to generate a count map histogram mapping each of the pixels to the count of scintillation events localized to the pixel, wherein the scintillation events are responsive to gamma radiation from a radiation source different from a phantom, such as radiation from the scintillators in the absence of a subject or radiation from a selected region of the subject; and
  a compensation processor configured to
  receives PET data from a subject during a PET scan;
  adjusts the PET data based on the count map histogram to compensate for pixels which have a low or zero count in the count map histogram;
  store unique identifiers of the identified non-functioning pixels in a pixel memory for use during pixel compensation; and
  compare the identified non-functioning pixels against previously identified non-functioning pixels of the pixels memory;
  wherein a newly identified non-functioning pixel is only used for pixel compensation after it has been identified as non-functioning in a predetermined number of scans.

* * * * *